United States Patent [19]

Gibson et al.

[11] Patent Number: 4,704,817
[45] Date of Patent: Nov. 10, 1987

[54] TROTLINE REEL

[76] Inventors: Phillip R. Gibson, 223 N. Golden, Springfield, Mo. 64802; Dean L. Richardson, Rte. 1, Box 26, Urbana, Mo. 65767

[21] Appl. No.: 10,179

[22] Filed: Feb. 2, 1987

[51] Int. Cl.⁴ ............................................. A01K 97/00
[52] U.S. Cl. ..................................................... 43/57.3
[58] Field of Search ........................... 43/57.3; 242/96

[56] References Cited

U.S. PATENT DOCUMENTS

| 2,531,816 | 11/1950 | Homoky | 43/57.3 |
| 2,629,197 | 2/1953 | Duvall | 43/57.3 |
| 2,857,706 | 10/1958 | Skains | 43/57.3 |
| 3,818,625 | 6/1974 | Shults | 43/57.3 |
| 4,091,559 | 5/1978 | Easley | 43/57.3 |
| 4,453,843 | 6/1984 | Martyniuk | 43/57.3 |

FOREIGN PATENT DOCUMENTS 57415  9/1924  Sweden ................. 43/57.3

Primary Examiner—Gene P. Crosby
Attorney, Agent, or Firm—Schmidt, Johnson, Hovey & Williams

[57] ABSTRACT

A trotline reel assembly includes a elongated shaft, a crank member fixed to the shaft for rotation thereof, and a handle rotatably connected to the shaft adjacent the crank for supporting the assembly. A main or major line of a trotline is wound about the shaft adjacent the handle during rotation of the crank, and as each drop line or leader line is encountered, the corresponding hook is inserted into an open end of the shaft remote from the crank and handle. The assembly presents an open, unrestricted area between the wound extent of the major line and the open end of the shaft for receiving the leader lines and facilitating insertion of hooks in the open end of the shaft regardless of the spacing of the leader lines along the length of the major or main line. Preferably, a flange fixed to the shaft between the wound major line and the handle substantially precludes entanglement of the trotline with the handle as the shaft is rotated to reel in the line.

5 Claims, 5 Drawing Figures

TROTLINE REEL

BACKGROUND OF THE INVENTION

1. Field of the Invention

This invention relates to a lightweight, hand held reel for receiving and storing a trotline in an untangled disposition. The reel includes a substantially cylindrical, elongated shaft having a first end portion for receiving the major or main line of the trotline and a second end portion remote from the first end portion for receiving hooks secured to leaders extending outwardly from the main line of the trotline. The reel presents an open area between the wound main line and the open end of the shaft receiving the hooks for enabling rapid winding and unwinding of the trotline regardless of the possibility that the spacing between adjacent leaders may vary along the major line of the trotline.

2. Background of the Invention

Trotlines have been long used for both commercial and recreational fishing, and in general comprise a elongated, flexible main or major line with a plurality of smaller lines or leader lines connected to the major line at spaced locations along the latter. Each of the leader lines remote from the major line carries a hook for receiving bait. Opposite ends of the major line may be connected to anchors or shoreline objects to extend to the trotline across a body of water, so that the leader lines and the hooks secured thereto are simultaneously suspended in a multiplicity of positions in the water to therefore increase the likelihood of successfully catching a number of fish.

In certain of the known trotlines, each leader is separate from the major line and is coupled thereto by a swivel connector. Other types of known trotlines are formed from a single length of fishing line which is knotted at appropriate intervals to present a number of double-stranded leader lines. In all cases, however, each leader functions to enable the hook to be located at a distance spaced from the main or major line to provide slack between the various hooks and the main line and to enable each hook to fall toward a suitable location in accordance with the bottom contour of the stream, lake, or body or water receiving the trotline.

One prior art device that has been brought to our attention is disclosed in U.S. Pat. No. 4,453,843 to Martyniuk, dated June 12, 1984. U.S. Pat. No. 4,453,843 discloses a trotline reel having an elongated, cylindrical shaft with a line receiving spool thereon and a number of elastic bands coupled to an end of the shaft remote from the spool. Each elastic band is adapted to receive a hook connected to a leader of a trotline, and the leader is then inserted in a corresponding slot of a wall of the spool and the entire spool and shaft are simultaneously turned until the next adjacent leader and hook are encountered.

Unfortunately, the reel that is illustrated and described in U.S. Pat. No. 4,453,843 is somewhat difficult to use during winding of the line on the reel because one hand of the fisherman must be used to guide the line onto the spool while the other hand is needed for both supporting the reel assembly and rotating the same. Moreover, each hook is to be received by one of the elastic bands and the corresponding leader is then to be inserted in an adjacent slot in the spool which placement is not always feasible because of the possibility of inconsistent spacing of the leaders along the length of the major or main line; in addition, tangling of the line may result if more than one hook and leader are received in corresponding bands and slots. In addition, the bands and slots generally prohibit quick, easy winding and unwinding in the trotline.

It would be a desirable advance in the art to provide a trotline reel that is easy to use in comparison to the known, somewhat awkward devices of the prior art and yet is adapted to receive a line and retain the same in an untangled disposition regardless of the exact location of the leaders along the main line.

SUMMARY OF THE INVENTION

Our present invention overcomes the above noted disadvantages of known prior art devices by provision of a reel assembly having a handle which may be grasped by one hand and a crank which may be rotated by the other hand to easily wind the major line of the trotline about a shaft as the trotline is received directly from the water. Each hook of the trotline is inserted in an open end of the shaft remote from the crank and the assembly presents an open, unrestricted space between the open end of the shaft and the region of the shaft receiving the line so that the various leaders need not be inserted into slots or the like of a spool, thereby facilitating winding and unwinding of the trotline where spacing between adjacent leaders is not necessarily known or uniform.

More particularly, and in accordance with the principles of the present invention, the trotline reel assembly comprises an elongated shaft of substantially uniform cross-section and a handle that is rotatably coupled to a first end portion of the shaft next to a hand-engagable crank which is parallel to the shaft in an offset relationship thereto. The main line of the trotline is wound about the shaft adjacent a flange next to the handle and the flange prevents the line from becoming entangled with the handle. In preferred embodiments, the handle presents a hollowed interior which is adapted to be mounted over an upstanding pole or rod fixed to the boat in order to free one hand of the user for other tasks as may be desired.

Optionally, many of the components comprising the reel assembly may be fabricated from conventional, readily available PVC or CPVC pipe and pipe fittings. In this regard, it has been found that the inner diameter of a nominal one-half inch PVC pipe coupling fixedly mounted on an end of a length of nominal one-half inch PVC piping is of an ideal size to receive twenty to twenty-eight fishing hooks in an untangled disposition. Moreover, the coupling functions to reinforce the end of the pipe section for providing strength and resistance to wear.

DETAILED DESCRIPTIONS OF THE DRAWINGS

Figure 1:
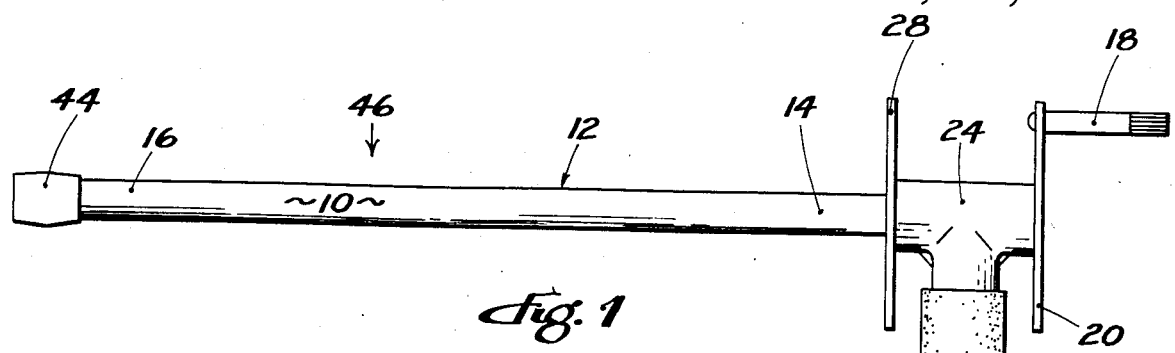
FIG. 1 is a side elevational view of the trotline reel assembly of our present invention with a portion of a resilient foam handle covering broken away in section to reveal an internal, rigid handle.

In accordance with our present invention, there is shown in FIG. 1 a trotline reel assembly which is broadly designed by the numeral 10. An elongated shaft 12 of the assembly 10 has a substantially uniform cross-section along the length of the shaft 12 and includes a first end portion 14 and a second end portion 16 remote from first end portion 14.

Figures 3, 4, 5:
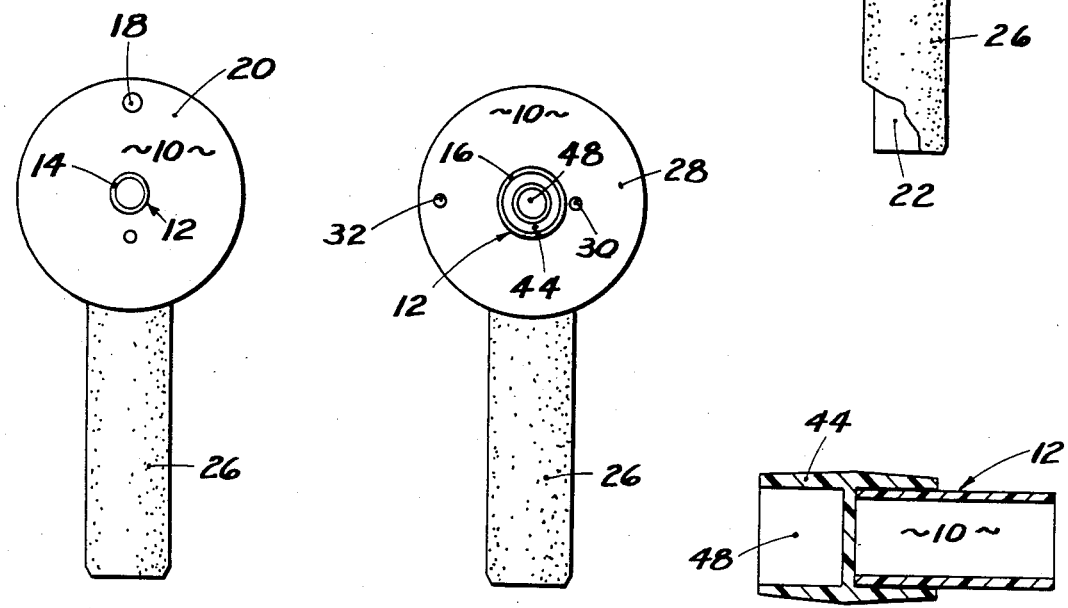
FIG. 3 is an end elevational view of the assembly as shown in FIG. 1 taken along the right-hand side of the latter.
FIG. 4 is an end elevational view of the trotline reel assembly depicted in FIG. 1 taken from an end of the assembly that is opposite to the end shown in FIG. 3.
FIG. 5 is an enlarged, fragmentary, side cross-sectional view of an end portion of the trotline reel assembly as shown in FIG. 1.
Figure 2:
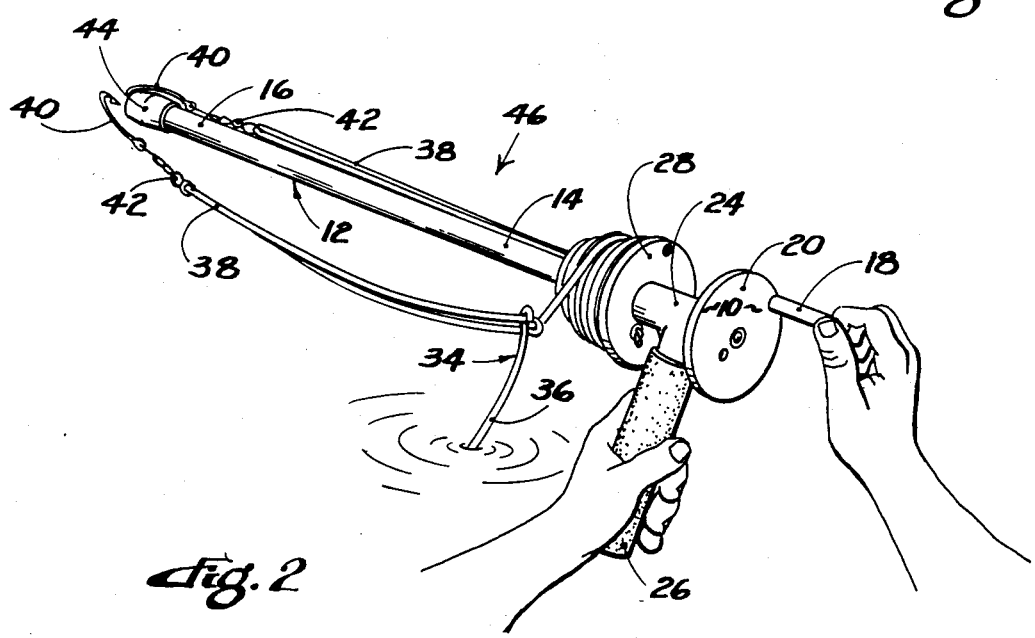
FIG. 2 is a reduced perspective view of the reel assembly shown in FIG. 1 illustrating for exemplary purposes one suggested method of use of the device.

As illustrated in FIGS. 1-3, a crank means including a crank member 18 is fixedly connected to the first end portion 14 of shaft 12 for rotation of the latter. A circular plate 20 fixed to shaft 12 extends in a reference plane transverse to the longitudinal axis of shaft 12. Crank member 18 is connected to the plate 20 and longitudinally extends in a direction parallel to the shaft 12.

Viewing FIG. 1, a handle means or handle 22 is rotatably coupled to the first end portion 14 of the shaft 12 adjacent the plate 20 and crank member 18 for supporting the shaft 12 during rotation of the same. Preferably, the handle 22 is secured to one leg of a tee fitting leg 24, and the other two legs of fitting 24 rotatably receive the first end portion 14 of the shaft 12 therethrough (in this regard, see also FIG. 2). Handle 22 is preferably hollow along the entire length thereof and is surrounded by a resilient foam covering 26 for cushioning the hand and preventing slippage.

A flange 28 is fixed to the shaft 12 adjacent the handle 22 and extends in a transverse reference plane radially outwardly of the cyclindrical shaft 12. As shown best in FIG. 4, the flange 28 is of a circular configuration and includes an inner hole 30 and an outer hole 32 for purposes to be explained hereinafter. Referring to FIG. 1, flange 28 and plate 20 are directly adjacent opposite legs of the tee fitting 24 and together function to substantially preclude movement of the fitting 24 in a direction longitudinally of the shaft 12, while permitting rotation of the fitting 24 and handle 22 therewith relative to shaft 12.

An elongated trotline, broadly designated 34, is comprised of well known, flexible fishing line and includes a main or major line 36 and a plurality of drop lines or leader lines 38, two of which are shown in FIG. 2. Each of the leader lines 38 is connected at spaced locations along the length of the elongated major line 36, and a fishing hook 40 is connected to each of the leader lines 38 at a position spaced from the interconnection between the respective leader line 38 and the major line 36.

The trotline 34 as shown in FIG. 2 for illustrative purposes is comprised of a single fishing line which is knotted at spaced locations to present each of the drop lines or leader lines 38. However, it can be readily appreciated that trotline 34 can alternatively be comprised of separate, individual leader lines that are coupled, perhaps by a swivel connector, to a continuous length of a main or major line. Moreover, the trotline 34 shown in FIG. 2 preferably includes a swivel connector 42 which couples each of the fishing hooks 40 to the respective leader line 38, although other configurations are of course possible.

As illustrated in FIGS. 1-5, the second end portion 16 of the shaft 12 includes a reinforcing coupling 44. Preferably, the coupling 44 and the remaining, major extent of the shaft 12 are formed from commercially available, nominal one-half inch PVC or CPVC piping. On the other hand, tee fitting 24 and handle 22 are preferably constructed of PVC or CPVC piping which is three-quarter inch in nominal size.

It has been found that coupling 44 when of a nominal one-half inch size presents an opening 48 that is approximately five-eighths inch in diameter which is ideal for receiving and retaining approximately twenty to twenty-eight fishing hooks 40. However, other sizes of couplings may be provided at the second end portion 16 of shaft 12 in situations where the trotline 34 includes treble hooks or hooks of a type other than the hooks 40 illustrated in FIG. 2.

In use of the assembly 10, one end of the major line 36 of trotline 34 is inserted into the inner hole 30 and tied in a knot as is depicted in FIG. 2. Next, the covering 26 surrounding handle 22 is grasped by one hand of the user while the remaining hand engages crank member 18. As the member 18 is turned in a circle, shaft 12 correspondingly rotates and begins to wind the major line 36 about the shaft 12 in area directly adjacent the flange 28, while the latter prevents tangling of the trotline 34 with the handle 22 or tee fitting 24.

As soon as the first leader line 38 is encountered, rotation of the crank member 18 is interrupted when the interconnection between the leader line 38 and the major line 36 is approximately two inches from the shaft 12 of assembly 10. At this time, the barbed end of the fishing hook 40 corresponding to the first leader line 38 is inserted into the opening 48 of the cylindrical end of the coupling 44. Next, rotation of the crank member 18 is resumed and the first leader line 38 comes taunt as the adjacent regions of the major line 36 are wound about shaft 12.

As each of the remaining leader lines 38 is encountered, the corresponding fishing hooks 40 are likewise inserted into the opening 48 of coupling 44 as additional regions of the major line 36 are reeled in by rotation of crank member 18. Once all of the fishing hooks 40 have been secured to coupling 44 and the remaining extent of the major line 36 approaches the reel assembly 10, the loose end of the major line 36 is fed through the outer hole 32 and knotted to thereafter retain the trotline 34 in a stored configuration about shaft 12, ready for further use whenever needed.

As can now be appreciated, the assembly 10 presents an open, unrestricted area 46 (FIGS. 1 and 2) between the wound major line 36 and the opening 48 of shaft 12 for receiving each of the leader lines 38 and facilitating insertion of the fishing hooks 40 in the coupling 44 regardless of the spacing of the leader lines 38 along the length of the major line 36. As such, the open area 46 enables each leader line 38 to lay adjacent the length of shaft 12 without requiring, for example, that each leader line 38 be received in a predefined slot or channel as is common with devices of the prior art.

From the foregoing, it is apparent that the present invention provides particularly simple but highly effective means for retaining the trotline 34 in an untangled disposition about shaft 12 while permitting ready winding or unwinding of the trotline 34 as may be desired. It is recognized, of course, that those skilled in the art may make various modications or additions to the preferred embodiment chosen to illustrate the invention without departing from the gist and essence of our contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. A trotline reel assembly comprising in combination:

an elongated shaft of substantially uniform cross-section throughout and having a first end portion and a second end portion remote from said first end portion;

crank means fixedly connected to said first end portion of said shaft for rotation of said shaft;

handle means rotatably coupled to said first end portion of said shaft adjacent said crank means for supporting said shaft during rotation of the latter;

a flange fixed to said shaft adjacent to said handle means and extending in a direction radially outwardly of said shaft; and an elongated trotline including an elongated major line, a plurality of leader lines connected at spread locations to said major line along the length of latter, and a plurality of fishing hooks each coupled to one of said leader lines, said major line being wound directly on said shaft between said flange and said second end portion with said flange being operable to substantially prevent said line from becoming entangled with said handle means, said second end portion of said shaft having an open end, said hooks being directly received in said open end of said shaft as said major line is wound about said shaft, said assembly presenting an open, unrestricted area between said wound major line and said open end of said shaft for receiving said leader lines and facilitating insertion of said hooks in said open end of said shaft regardless of the spacing of leader lines along the length of said major line.

2. The trotline reel assembly as set forth in claim 1, wherein said second end portion of said shaft is reinforced adjacent said open end.

3. The trotline reel assembly as set forth in claim 1, wherein said handle means is elongated, extends in a direction radially outwardly of said shaft, and presents an open end remote from said shaft for reception onto a rod of a boat or the like.

4. The trotline reel assembly as set forth in claim 3, wherein said handle is hollow substantially along the entire length thereof.

5. The trotline reel assembly as set forth in claim 1, wherein said crank means comprises a plate fixed to said shaft extending in a plane transverse to the longitudinal axis of said shaft and a hand-engageable crank member connected to said plate and extending in a direction generally parallel to said shaft.

* * * * *